Bowden et al.

United States Patent [19]

[11] 4,446,537

[45] May 1, 1984

[54] ELECTRONIC SYSTEM FOR RELEASE OF ON-BOTTOM SEISMOMETER UNIT

[75] Inventors: Edgar A. Bowden, Arlington; Gordon R. Deline, Carrollton; Gerard D. Koeijmans, Dallas, all of Tex.

[73] Assignee: Mobil Oil Corporation, New York, N.Y.

[21] Appl. No.: 458,422

[22] Filed: Jan. 17, 1983

Related U.S. Application Data

[63] Continuation of Ser. No. 163,592, Jun. 27, 1980, abandoned.

[51] Int. Cl.$^3$ .............................................. G01V 1/38
[52] U.S. Cl. ..................................................... 367/15
[58] Field of Search .................. 367/2, 4, 15, 16, 133, 367/134; 307/23, 64, 65, 66, 67

[56] References Cited

U.S. PATENT DOCUMENTS

| | | | |
|---|---|---|---|
| 3,816,768 | 6/1974 | Stein | 307/23 |
| 3,835,333 | 9/1974 | Balan | 307/23 |
| 3,912,940 | 10/1975 | Vince | 307/64 |
| 3,949,238 | 4/1976 | Brookes | 307/23 |
| 4,035,716 | 7/1977 | Hutchinson | 307/64 X |
| 4,138,658 | 2/1979 | Avedik et al. | 367/15 |
| 4,209,710 | 6/1980 | Quarton | 307/66 |

FOREIGN PATENT DOCUMENTS 1550518  8/1979  United Kingdom .

OTHER PUBLICATIONS

Bookbinder et al., *Conference Proceedings, Ocean 78*, Wash. D. C., pp. 510-516, Sep. 1978.
Prothero, Jr., *Offshore Technology Conference*, 1976, Paper, No. Otc2440.

*Primary Examiner*—Richard A. Farley
*Attorney, Agent, or Firm*—Alexander J. McKillop; Michael G. Gilman; Frank J. Kowalski

[57] ABSTRACT

In an on-bottom seismometer, the electronic system for operating the release mechanism includes a plurality of independent power sources. A plurality of release condition sensors each produce a release output upon the occurrence of a condition in which the unit is to be recovered at the water's surface. Logic circuitry responds to the release condition sensors for producing a relase signal which is applied to driving circuits for primary and secondary release devices. Switching means automatically connect the logic circuitry and the driving circuitry to an operable one of the power sources.

11 Claims, 7 Drawing Figures

ELECTRONIC SYSTEM FOR RELEASE OF ON-BOTTOM SEISMOMETER UNIT

This is a continuation of copending application Ser. No. 163,592, filed June 27, 1980, presently abandoned.

BACKGROUND OF THE INVENTION

This invention relates to the electronic system for a release mechanism for an off-bottom seismometer, and more particularly to a system which reliably releases the seismometer unit in the event of power supply or other equipment failure.

On-bottom seismometers are deployed on the ocean floor to measure seismic energy, for example, that are repetitively produced by a seismic exploration vessel.

Recently, "pop-up" type on-bottom seismometers (OBS) have been increasingly used for deep water seismic exploration. Pop-up seismometers generally comprise a frame fitted with floats, instruments, power sources and ballast. Released at the ocean's surface, they are allowed to free fall to the ocean floor. Recovery is accomplished by the planned release of a ballast which allows the then buoyant assembly to float to the water's surface where it may be retrieved.

In recent years, a variety of ocean bottom seismometers have been constructed and used, each with its own release mechanism. In an article "Ocean Bottom Refraction Seismograph (OBRS)" published in *Marine Geophysical Researches* 3 (1978), F. Avedik, et al schematized an OBS release mechanism.

An electroplating stainless steel wire release mechanism was described by A. K. Ibrahim, et al at the 46th Annual Society of Exploration Geophysicists meeting of Oct. 24, 1976 in Houston Tex. The OBS in which the release mechanism was employed was relatively small (weighing approximately 170 pounds) and consisted of a single buoyant glass sphere mounted to a frame by three elastic straps joined together by a piece of stainless steel wire. Release was achieved by passing an electric current through the stainless steel wire causing it to electroplate into solution when exposed to sea water.

Many of the release mechanisms employed thus far have used explosive bolts as a means of releasing the ballast. Although relatively safe, explosive bolts represent a danger to personnel working with the OBS prior to its launch as well as during and after its recovery if an unexploded bolt is still present. Although redundant means of releasing the buoyant package have been utilized on OBS's, such systems generally employ more than one explosive bolt.

RELATED APPLICATIONS

Co-pending application Ser. No. 144,092, filed Apr. 28, 1980—Prior, "Release Mechanism for On-Bottom Seismometer", now U.S. Pat. No. 4,300,254, discloses the mechanical release mechanism for which the present invention can be used. Application Ser. No. 163,757, filed June 27, 1980, Bowden, et al discloses the overall system for timing the operation of an on-bottom seismometer, including its release. These applications are incorporated herein by reference.

One of the problems in reliably releasing such an on-bottom seismometer from the ocean bottom is that all of the electrical components must operate. If the power supply for any part of the system fails, then the entire release mechanism fails. For example, in a system of the type under consideration, it is desirable to release the mechanism in response to the occurrence of different release conditions. The logic circuitry which responds to these release conditions must be supplied with power in order to effectuate recovery. Similarly, the release devices have driving circuitry which must be operable regardless of whether the power supply for them fails. It is not possible to provide a redundant power source for each circuit in the release system. Rather, it is desirable to provide a plurality of power supplies which are automatically switched to the necessary release circuits so that each circuit is always connected to an operable power source.

OBJECTS OF THE INVENTION

An object of the present invention is to provide an electronic system for releasing an on-bottom seismometer from the ocean bottom reliably.

Another object of this invention is to provide an on-bottom seismometer which will be released from the ocean bottom even in the event of equipment failure such as failure of one of the power supplies, i.e., a battery.

Another object of the present invention is to provide a system for releasing an on-bottom seismometer in which a plurality of release conditions sensors actuate the release.

Another object of the present invention is to provide an electronic system for an on-bottom seismometer in which the logic circuitry which responds to the release condition sensors and the driving circuitry for the release devices are both automatically connected to an operable power supply.

SUMMARY OF THE INVENTION

In accordance with the present invention, switching means automatically connect an operable power source to the logic circuitry and to the driving circuitry for the release devices in an on-bottom seismometer.

Further in accordance with the invention, the release system includes circuitry for effectuating a normal release at a predetermined time after deployment or in response to a command which originates at the water's surface. Also, abort circuitry is provided for actuating the release mechanism in response to a failure in the unit. For example, the detection of a battery failure or the detection of a water leak effectuates a release of the on-bottom seismometer.

Further in accordance with the present invention, a primary release mechanism and a secondary release mechanism are provided. The primary release mechanism is actuated only by the normal release logic circuitry. However, the abort logic circuitry actuates both the primary release mechanism and a secondary release mechanism.

Further in accordance with the present invention, both the primary and secondary release mechanisms are automatically switched to an operable power source.

Further in accordance with the invention, the secondary release mechanism includes an electrically dissolvable wire connected at one end to reference potential and connected to two power sources through unidirectional conducting devices, so that current can be supplied to the wire from one of the sources which is operable.

Further in accordance with the present invention, a leak detector includes a conductive metal strip electrically insulated and physically separated from the chassis of said unit. A water leak circuit is connected between the metal strip and the chassis and produces an output when water bridges the separation between the strip and the chassis.

Further in accordance with the present invention, the regulator circuit which supplies power to the logic circuitry is connected by a switching circuit to an operable power source so that the logic circuit always receives power.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
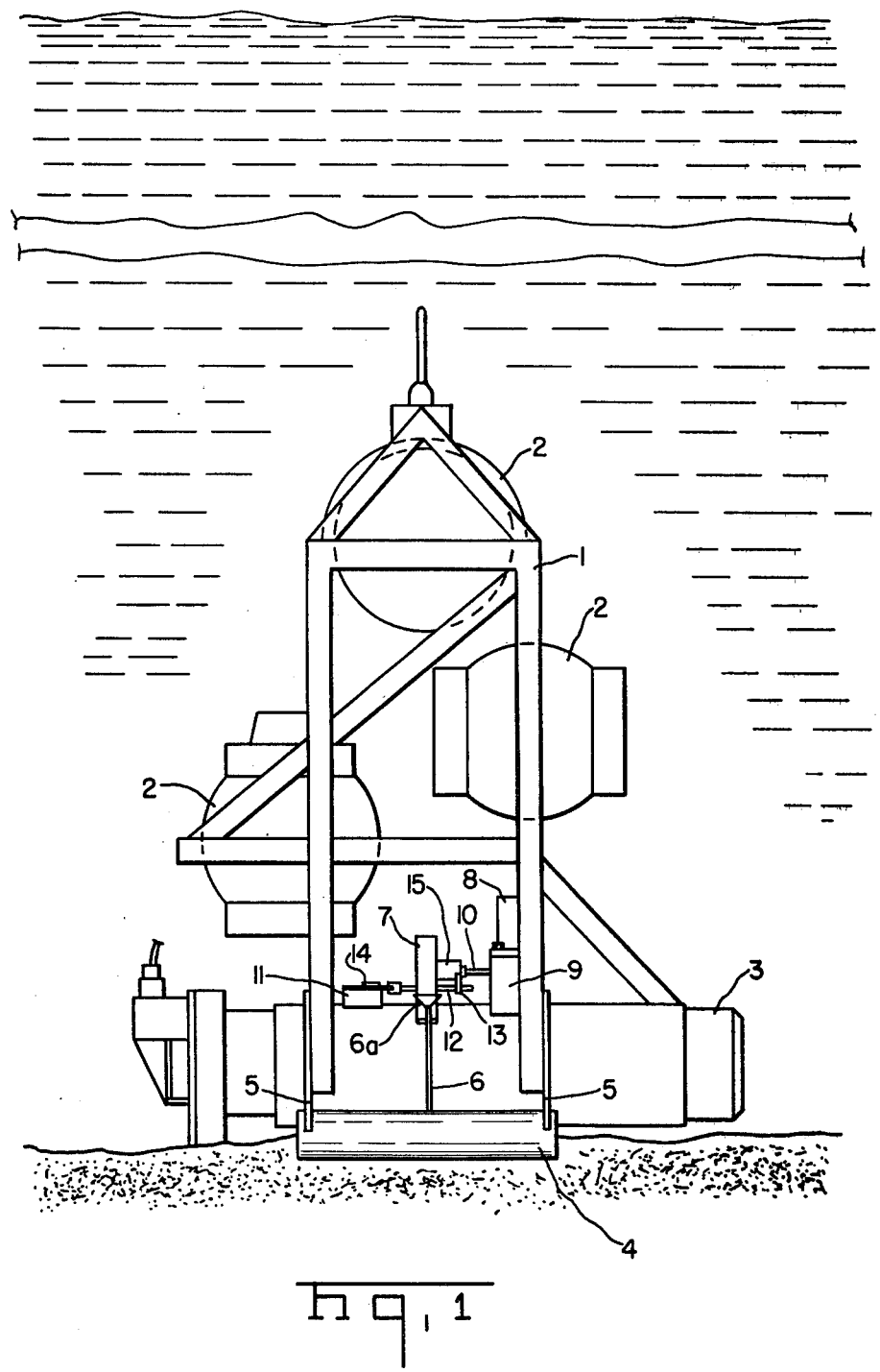
FIG. 1 shows the on-bottom seismometer unit and the release mechanism to which the present system is applicable.

Referring to FIG. 1, the on-bottom seismometer and its release mechanism are of the type described in the aforementioned Prior application. Briefly, the major components of the OBS depicted in FIG. 1 include a frame 1, floats 2, a sealed instrument housing 3, and a ballast tube 4. An identical ballast tube is symmetrically located on the other side of the OBS. A lead 6 from the ballast tube 4 to a release lever housing 7 is maintained under tension prior to ballast release and holds the ballast tube against plates 5 which are mounted to the frame and are contoured to mate with the ballast tube. A loop 6a at the end of lead 6 from the ballast tube 5 is secured in the release lever housing 7. A similar lead 6 and loop 6a from the ballast tube on the "rear" side of the OBS (as viewed in FIG. 1) is secured symmetrically on the "rear" side of the housing 7. The primary release device includes a rotary solenoid 8, a rotary solenoid mount 9 and a rotary solenoid linkage arm 10. The secondary release device includes dissolvable wire assembly 14, an assembly mount 11, a shaft 12, connected to the wire assembly, a dog 13 movably mounted on shaft 12 and a cylindrical spring housing 15 containing a compressed coil spring (not depicted). The rotary solenoid linkage arm 10 is attached to, and the cylindrical spring housing 15 fits under the head of a pin (not depicted) which passes through the release lever housing 7 to immobilize levers (not depicted) securing the ends of the leads 6. This release mechanism is more fully described in the aforementioned Prior application.

Figure 2:
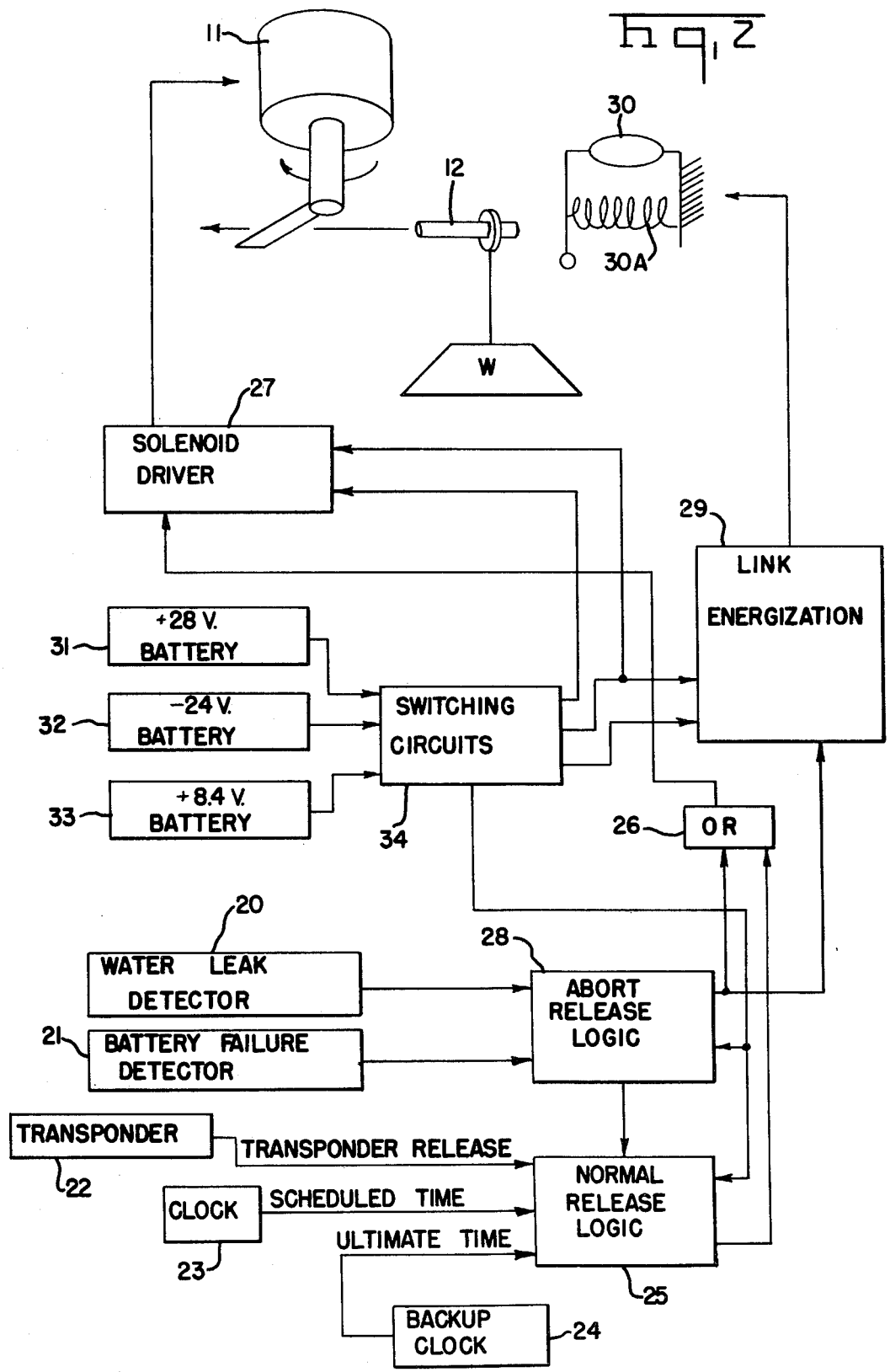
FIG. 2 is a block diagram of the system of the present invention.

Referring now to FIG. 2, the electronic system for releasing the seismometer unit includes a pluarlity of release condition sensors, including a water leak detector 20, a battery failure detector 21, a transponder 22, a clock 23, and a back-up clock 24. Normally, the seismometer is released at a predetermined time after deployment as more fully described in the aforementioned Bowden, et al application. The clock 23 and back-up clock 24 produce a release output at predetermined times. Alternatively, the unit may be released by an acoustic command from the exploration vessel. This acoustic command is detected by the transponder 22, which produces a release output. These release outputs are applied to the normal release logic 25 which produces a one second pulse indicating a normal release. This acts through OR gate 26 to energize solenoid driver 27.

The water leak detector 20 and the battery failure detector 21 provide an indication of a failure in the unit. In this event, it is also desirable to release the unit. The release outputs of these two sensors are applied to abort release logic circuit 28 which produces an output which acts through OR gate 26 to actuate the primary release mechanism. The abort release logic 28 also effectuates an energization of the secondary release mechanism. Link energization circuit 29 supplies current to the electrically dissolvable wire 30 in the secondary release mechanism. When the wire 30 is electrolyzed, a compressed spring 30A actuates the pin (not depicted) which releases the ballast weight.

In accordance with the invention, a plurality of independent power sources including batteries 31, 32 and 33 are provided. These batteries are connected through switching circuits 34 to the solenoid driver 27, link energization 29, and to the logic circuits 25 and 28. The switching circuits 34 automatically connect an operable one of the batteries to the logic circuits and the driving circuits for the release devices.

Figure 3:
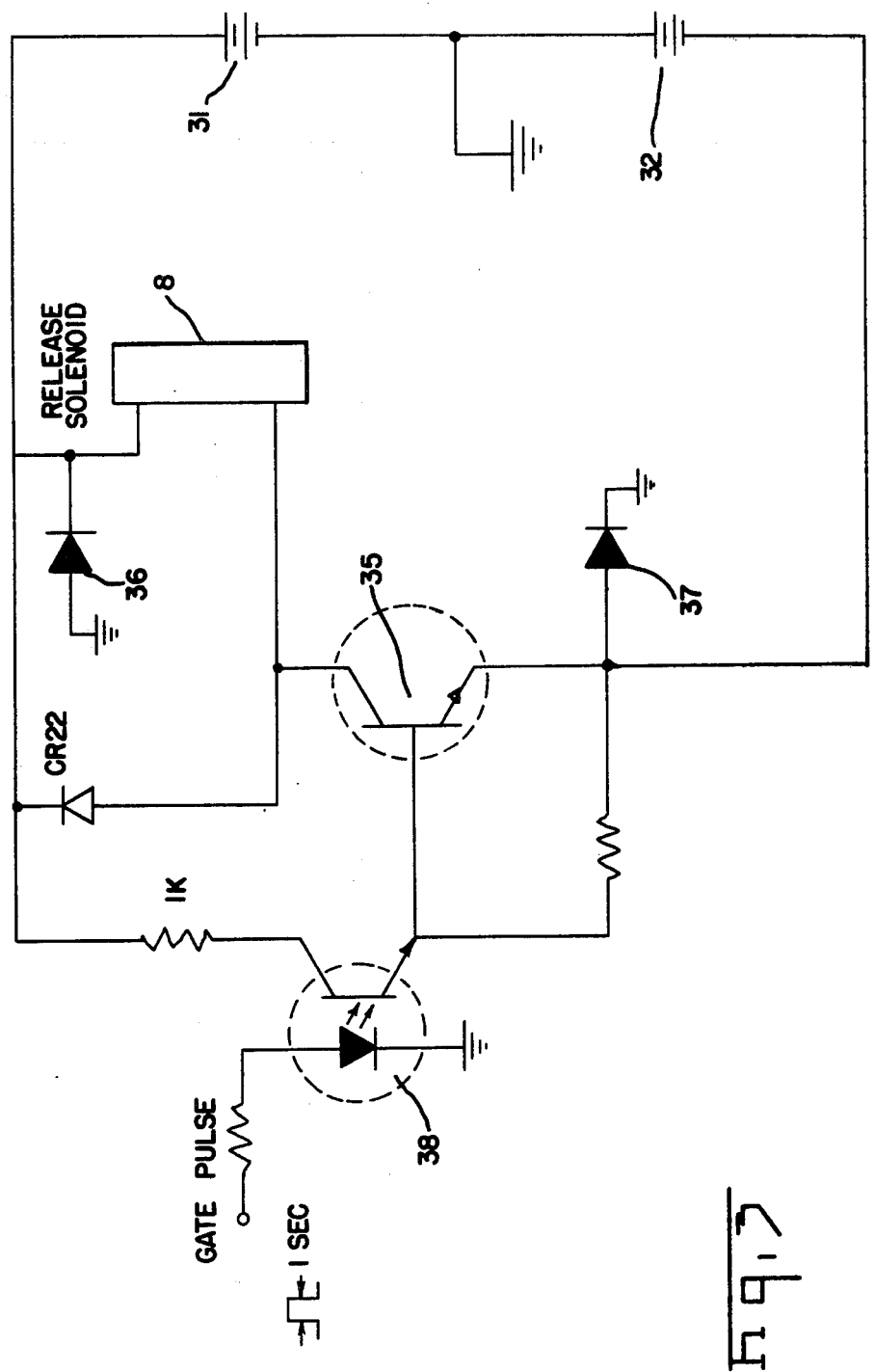
FIG. 3 is a circuit diagram of the switching and driving circuitry for the primary release device.

Referring to FIG. 3, the solenoid 8 for the primary release device is connected between the +28 volt battery 31 and the −24 volt battery 32. A power switching transistor 35 is connected in series with solenoid 8 and with batteries 31 and 32. Diodes 36 and 37 are connected between ground and each end of the solenoid 8. These diodes provide a path to ground for one or the other of the batteries 31 or 32, depending upon which is operable.

An optical coupler 38 controls the power switching transistor 35. When a release signal from OR gate 26 (FIG. 2) is applied to the optical coupler 38, it energizes the release mechanism regardless of which power source is operable. The use of an optical coupler is important because it allows the switching element of coupler 38 to "float" to the potential of transistor 35 depending upon which one of sources 31 or 32 is operable.

The operation of the circuit of FIG. 3 is as follows. A one second pulse from the abort release logic or the normal release logic turns on the optical coupler 38. This turns on the power switching transistor 35. If battery 31 fails, either an open or a short, diode 36 becomes forward biased, allowing current to flow from reference potential (ground) through solenoid 8, and power switching transistor 35 into the negative terminal of battery 32.

If battery 32 fails, diode 37 becomes forward biased, allowing current to flow from the positive terminal of battery 31 through the solenoid 8, driving transistor 35 and diode 37 to reference potential.

When both batteries, battery 31 and battery 32, are operable, the solenoid is energized from the power from both batteries by a current flow from the positive terminal of battery 31 through release solenoid 8, through transistor 35 and to the negative terminal of battery 32, the positive terminal of battery 32 being connected to the negative terminal of battery 31. In the example illustrated in FIG. 3, battery 31 was a 28 volt battery while battery 32 was a 24 volt battery. Any time battery 31 is operable, diode 36 is reverse biased and similarly when battery 32 is operable diode 37 is reverse biased. Under normal conditions when both battery 31 and battery 32 are operable, both serve to actuate release solenoid 8 when transistor 35 is turned on. Only when battery 31 or battery 32 becomes inoperable, diode 37 or diode 36 become forward biased, respectively.

Diode CR 22 is essentially a protective diode used to dissipate energy stored in the inductive coil of release solenoid 8 after it has been actuated. When actuated, release solenoid 8 will store electrical energy in its coil which will decay exponentially through diode CR 22. In this manner, the primary release mechanism can be operated as long as one or both of the batteries 31 and 32 are operable.

Figure 4:
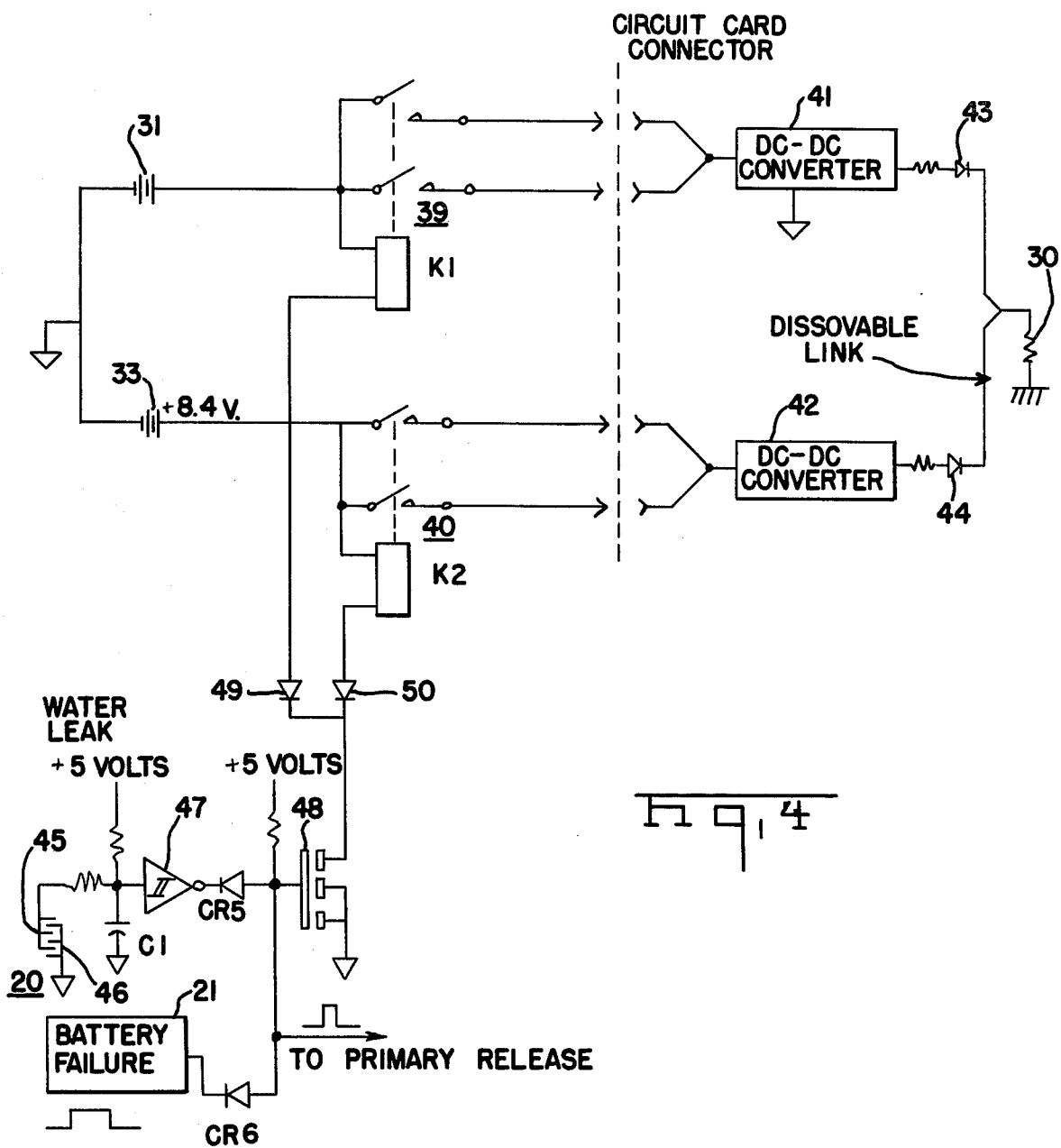
FIG. 4 shows the abort release logic, switching circuits and driving circuits for the secondary release device.

Referring to FIG. 4, the electrically dissolvable wire 30 is energized through the +8.4 volt battery 33 or through the +28 volt battery 31. These are connected through relays 39 and 40, DC-DC converters 41 and 42, and diodes 43 and 44 to the dissolvable wire 30. The purpose of the DC-DC converters 41 and 42 is to raise the potential at 30 high enough to break through insulation layers that may form over the exposed portion of the link wire. Current can be supplied to the wire from either sources 31 or 33, whichever is operable.

In the event of the seismometer flooding, or if any of the batteries fail, it is desirable to release the unit immediately and abort its deployment. In order to do this, a water leak detector 20 and a battery failure detector 21 are provided. Leak detector 20 includes a conductive strip 45 which is physically separated from a bulkhead 46 on the chassis of the unit. When water enters this separation, the water leak circuit which includes the Schmitt trigger 47, produces an output. This switches the base of transistor 48 to ground. Similarly, when the battery failure detector 21 produces an output, the base of transistor 48 is switched to ground. This renders transistor 48 conducting, and this pulls in relays 39 and 40 through diodes 49 and 50. Relays 39 and 40 are powered by batteries 31 and 33 respectively. They are isolated by diodes 49 and 50 so that failure of either battery 31 or 33 will not prevent the operation of a relay from the non-failed battery. Diodes 43 and 44 isolate the two DC-DC converters in such a way as to allow one to fail without preventing the operation of the other. Relays 39 and 40 have two sets of relay contacts connected to two sets of converter connections. Therefore, each driving circuit has two redundant paths for greater reliability.

Figure 5:
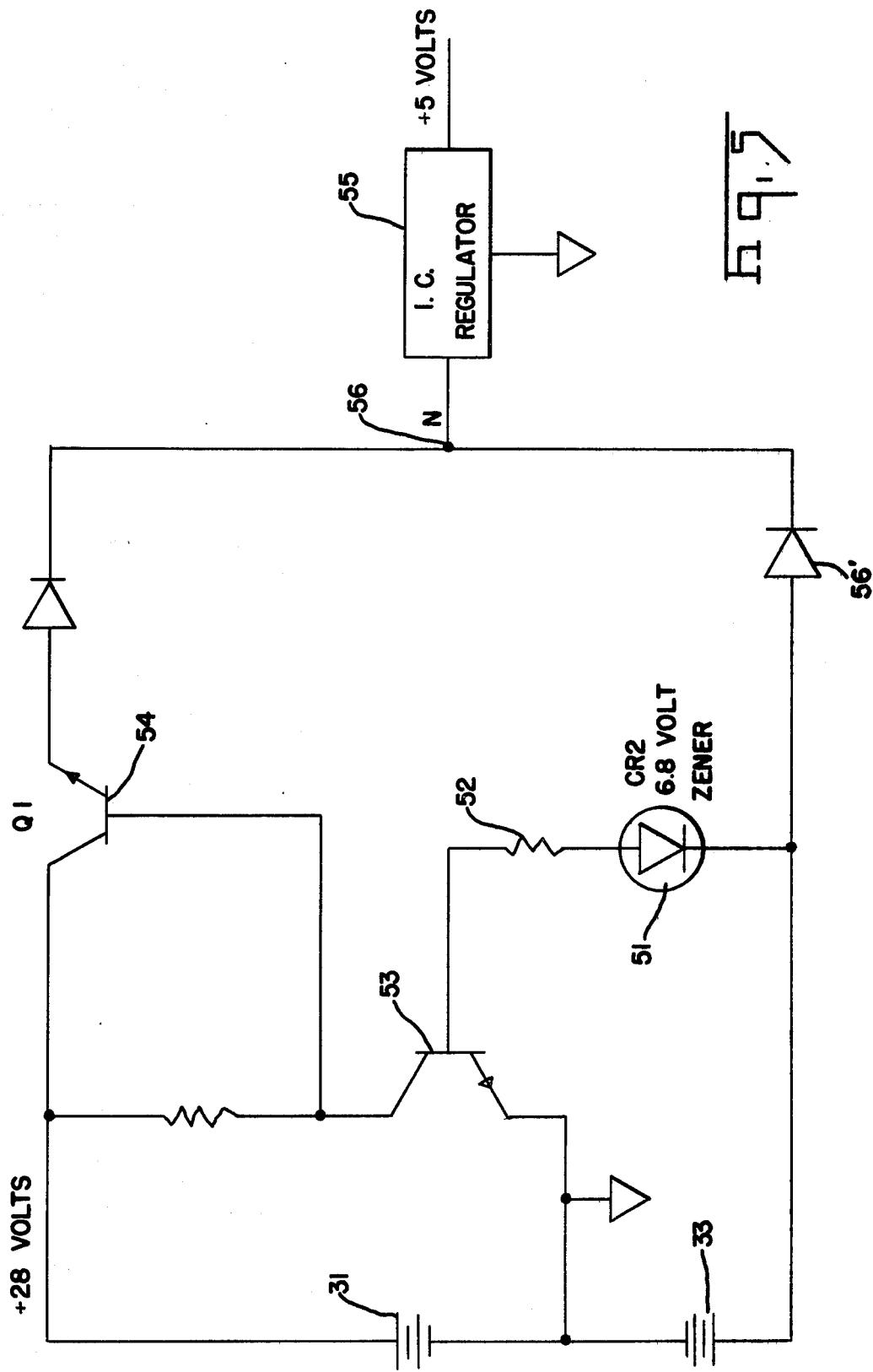
FIG. 5 shows the switching circuit for connecting an operable power source to the regulator circuit for the logic circuitry.

Referring to FIG. 5, the regulator circuit which provides power to the logic circuitry is connected to an operable battery through a switching circuit. The logic circuits 25 and 28 (FIG. 2) require +5 volts to operate. This voltage must be present in the event of a battery failure. It is desirable that the +8.4 volt battery 33 furnish the power since it has the higher capacity and that battery 31 not be drained unless battery 33 fails. In normal operation, +8.4 volts is present and low voltage avalanche diode 51 breaks down. This allows current to flow through resistor 52 into the base of transistor 53. This turns on transistor 53 which goes into saturation. The collector of transistor 53 is switched to a level near zero volts, causing the base of transistor 54 to be reversed biased. This turns transistor 54 off, thereby disconnecting battery 31 from the integrated circuit regulator 55. The regulator 55 draws current from battery 33 through diode 56.

If battery 33 fails, open or short, avalanche diode 51 ceases to avalanche below 6.8 volts. This causes a cessation of base current to transistor 53, thus switching transistor 53 out of saturation into a non-conductive state. Base current flows to transistor 54 when the voltage of the collector of transistor 53 exceeds the voltage at 56 by 1.2 volts. The transistor 53 is then switched on, thereby connecting the integrated circuit regulator 55 to the battery 31.

Figure 6:
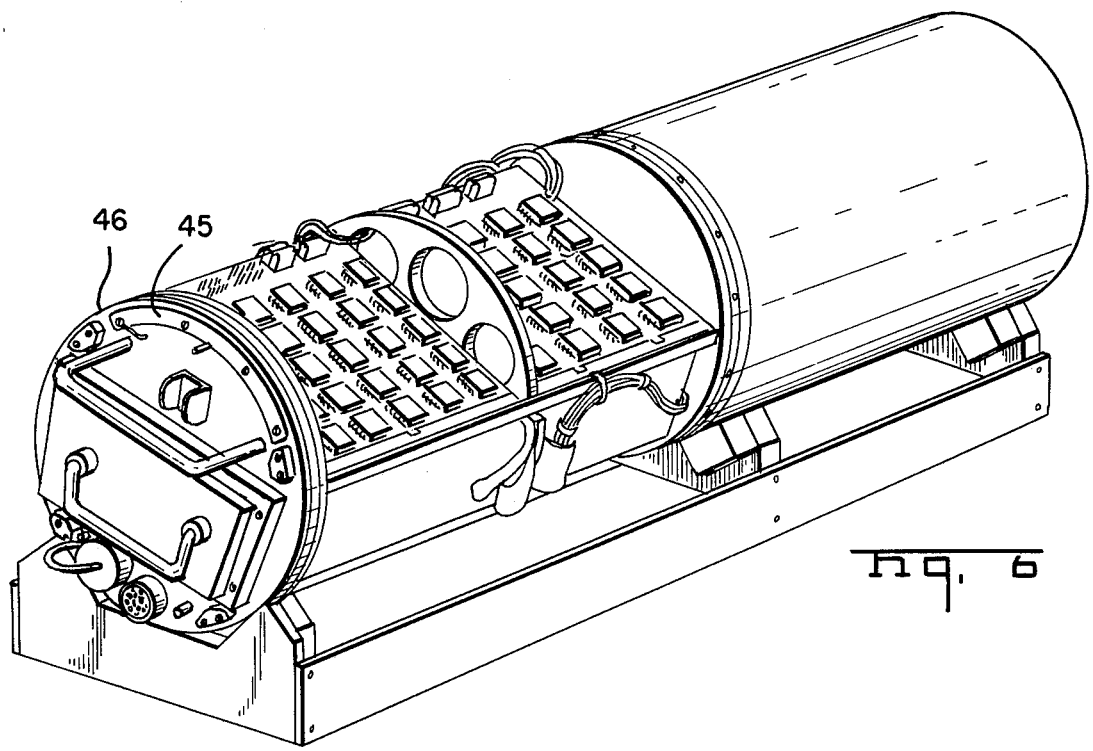
FIGS. 6 and 7 show the leak detector.
Figure 7:
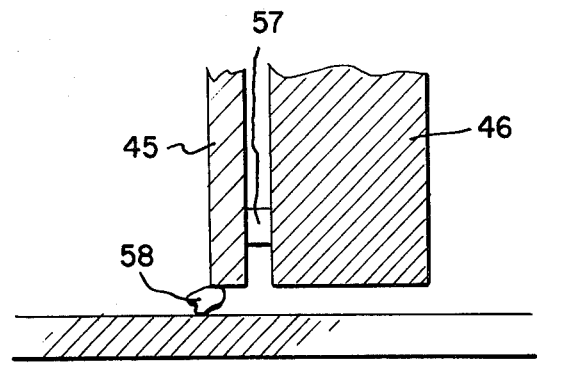

FIGS. 6 and 7 show the leak detector. The leak detector is mounted on the chassis of the sealed instrument housing 3. The brass strip 45 is separated from and insulated from the bulkhead 46 by the insulator 57. When a drop of water, as indicated at 58, bridges this separation the water leak detector is actuated.

While a particular embodiment of the invention has been shown and described, various modifications may be made. The appended claims are, therefore, intended to cover any such modifications.

What is claimed is:

1. A system for releasing an underwater unit comprising:
   a release mechanism for releasing a ballast weight from said unit;
   a plurality of release condition sensors, each producing a release output upon the occurrence of a condition in which said unit is to be recovered;
   logic circuitry responsive to said release condition sensors for producing a release signal;
   driving circuitry responsive to said release signal for actuating said release mechanism;
   two independent power sources connected to said logic circuitry and said driving circuitry both of said power sources providing power to said driving circuitry when both of said power sources are operable; and
   switching means for automatically disconnecting said logic circuitry and said driving circuitry from an inoperable one of said power sources.

2. The system recited in claim 1 wherein said logic circuitry includes:
   normal release logic circuitry for actuating said release mechanism at a predetermined time, or in response to a command which originates at the water surface; and
   abort release logic circuitry for actuating said release mechanism in response to a failure in said unit.

3. The system recited in claim 2 wherein said plurality of release condition sensors includes an electronic clock and a back-up clock producing a release output at predetermined times after said unit is deployed; and
   a transponder producing a release output upon receipt of an acoustic release command, said release outputs being applied to said normal release logic circuitry.

4. The system recited in claim 2 wherein said plurality of release condition sensors include a power source failure detector producing a release output if any of said power sources fail; and
   a water leak detector producing a release output upon the occurrence of a leak in said unit, said release outputs being applied to said abort release logic circuitry.

5. The system recited in claim 2 wherein said release mechanism includes primary and secondary independently operated release devices, each of which releases said ballast weight, said normal release logic circuitry being connected to actuate said primary release device, said abort logic circuitry being connected to actuate both said primary release device and said secondary release device.

6. The system recited in claim 1 wherein said driving circuitry includes:
   a solenoid for said release mechanism connected between two of said power sources; and
   wherein said switching means includes:
   a power switching transistor connected in series with said solenoid and said power sources.

7. The system recited in claim 6 further comprising:
   an optical coupler controlling said power switching transistor, said release signal being applied to said optical coupler to energize said release mechanism regardless of which power source is operable.

8. The system recited in claim 1 wherein said release mechanism includes an electrically dissolvable wire connected at one end to reference potential; and
   unidirectional conducting devices connected between said power sources and the other end of said dissolvable wire whereby current can be supplied to said wire from any operable power source.

9. The system recited in claim 1 wherein said release mechanism includes primary and secondary independently operated release devices each of which releases said ballast component; and
   means for connecting an operable one of said power sources to energize said release devices.

10. The system recited in claim 1 wherein said unit has a chassis which is electrically connected to reference potential and wherein one of said release condition sensors is a leak detector comprising:
    a conductive metal strip electrically insulated and physically separated from said chassis; and
    a water leak circuit connected between said metal strip and said chassis and producing an output when water bridges the separation between said strip and said chassis.

11. The system recited in claim 1 further comprising:
    a voltage regulator circuit for supplying power to said logic circuitry; and
    a switching circuit connected between said power sources and said regulator circuit for connecting an operable one of said sources to said regulator circuit.

* * * * *